Geo. & Haines O'Connor's Corn Sheller.

116987

PATENTED JUL 11 1871

Witnesses
Jno. A. Ellis
J. V. White

Inventor
Geo. & Haines O'Connor
Per,
F. H. Alexander
Atty 116,987

UNITED STATES PATENT OFFICE.

GEORGE O'CONNOR AND HAINES O'CONNOR, OF MISHAWAKA, INDIANA.

IMPROVEMENT IN CORN-SHELLERS.

Specification forming part of Letters Patent No. 116,987, dated July 11, 1871.

*To all whom it may concern:*

Be it known that we, GEORGE O'CONNOR and HAINES O'CONNOR, of Mishawaka, in the county of St. Joseph and State of Indiana, have invented certain new and useful Improvements in Corn-Shellers; and we do hereby declare that the following is a full, clear, and exact description thereof, reference being had to the accompanying drawing and to the letters of reference marked thereon which form a part of this specification.

The nature of our invention consists in the construction and arrangement of a corn-sheller, as will be hereinafter more fully set forth.

In order to enable others skilled in the art to which our invention appertains to make and use the same, we will now proceed to describe its construction and operation, referring to the annexed drawing, in which—

Figure 1:
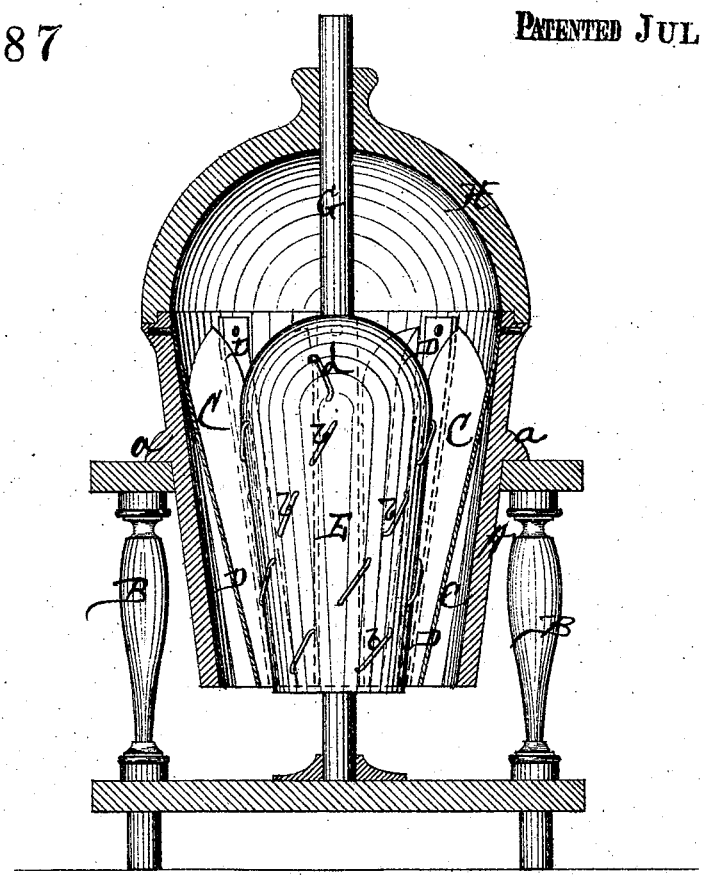
Figure 2:

Figure 1 is a longitudinal vertical section of our machine, and Fig. 2 is a perspective view of one of the ribs.

A represents a cylindrical vessel made tapering from the upper toward the lower end, and provided on the outside with a circumferential flange or rim, *a*, for supporting the vessel in a suitable stand or frame, B. On the inside of the vessel A, at suitable and equal distances apart, are placed ribs C C, which are secured by bolts, rivets, or other suitable means. These ribs run up and down in the vessel, forming passages for the ears of corn to pass down. They are constructed as shown, having one side square, or standing at right angles with the inner surface of the vessel, and leaving a sharp edge, *x*, while from this edge toward the other side the rib is rounded or beveled. The vessel A being tapering or contracting toward the lower end, the ribs C C must consequently be made narrower at the lower ends than at the upper, so as to make the passages between them of about the same width throughout. For this reason the rounded side of each rib becomes more abrupt toward the lower end, making the rib, or rather the curvature of the rib, spiral. The upper end of each rib is rounded off so as to form, as it were, an enlarged mouth or entrance to each passage between the ribs. Between the ribs C C, in each passage, is placed a spring, D, secured to the vessel A at its upper end and pointing inward at the lower end, so as to hold the ears of corn inward against the revolving cylinder E. This cylinder is placed on or secured to an upright shaft, G, having its lower bearing in the frame B, and its upper end passes through a dome-shaped cap, H, covering the vessel A. The cylinder E is also made tapering, so as to conform to the shape of the vessel A; and we propose to make it in the following manner: Two heads are secured to the shaft G at suitable distances apart, the lower one being of a smaller diameter than the upper, and the upper rounded or dome-shaped, as shown. To these heads is then secured a series of staves, forming the cylinder. Around the outer circumference of the cylinder E are arranged several series of ribs, *b b*, in spiral form, as shown.

The corn is fed into the machine through an aperture in the cap H, and the dome-shaped upper end of the cylinder E makes, with the rounded upper ends of the ribs C C, suitable funnel-shaped entrances for the corn to pass through. The springs D D now hold the corn so that it cannot pass too fast downward, and, while the cylinder E revolves, the ribs *b b* on the same knock all the corn off from the cob, at the same time as the ribs, being arranged spirally, feed the cob downward, and at last, after all the corn has been knocked off, allow it to pass out.

On top of the dome-shaped or conical cylinder E are placed one or more ribs, *d*, in an inclined position, which rib or ribs, when the cylinder revolves, knock or catch the ears of corn so as to turn them endwise and facilitate their passage in between the ribs C C of the vessel A. In fact, the rib or ribs *d* guide the corn into said passages.

It is not absolutely necessary for the vessel A and cylinder E to be tapering, although we prefer that shape. They may be made perfectly straight and answer the same purpose.

Having thus fully described our invention, what we claim as new, and desire to secure by Letters Patent, is—

1. The cylindrical vessel A, provided with ribs C C, constructed as described and shown, and springs D D, all arranged substantially as and for the purposes herein set forth.

2. The combination of the cylindrical vessel A, ribs C C, constructed as described, springs D D, and cylinder E, provided with rib or ribs $d$, all constructed and arranged to operate as shown.

In testimony that we claim the foregoing as our own we affix our signatures in presence of two witnesses.

GEORGE O'CONNOR.
HAINES O'CONNOR.

Witnesses:
HENRY HEISER,
HARRIS E. HURLBUT.